Dec. 13, 1955     T. E. HILLIS     2,726,829

CIRCULAR WING AIRCRAFT

Filed Oct. 4, 1954     2 Sheets-Sheet 1

INVENTOR.
Jed E. Hillis
BY
Albert J. Fihe
ATTORNEY

Dec. 13, 1955   T. E. HILLIS   2,726,829
CIRCULAR WING AIRCRAFT
Filed Oct. 4, 1954   2 Sheets-Sheet 2

INVENTOR.
Ted E. Hillis
BY
Albert J. Fihe
ATTORNEY

United States Patent Office 2,726,829
Patented Dec. 13, 1955

2,726,829

CIRCULAR WING AIRCRAFT

Ted E. Hillis, Burbank, Calif.

Application October 4, 1954, Serial No. 459,919

1 Claim. (Cl. 244—12)

This invention relates to a fixed wing aircraft and has for one of its principal objects the provision of a device of the class described which is capable of being safely operated by any person who is capable of operating an automobile.

One of the great deterrents to the ownership and use of personally owned individual aircraft is the high speed necessary for take-off and landing and the resultant maintenance at relatively distant and expensive airports.

One of the important objects of this invention is to provide an aircraft which is so constructed that it will eliminate the necessity of rapidly rotating air foils which, as now employed, are dangerous to persons and property.

Another important object of the invention is to provide an aircraft having a circular fixed air foil or wing instead of one which is straight or movable.

Yet another object of the invention is to provide in an aircraft having a fixed circular wing a plurality of blowers which propel air over the wing surfaces in such a manner that the desired lifting force results.

A still further important object of the invention is the provision in an aircraft of the fixed wing type of combination of a radial engine, a pair of oppositely turning blowers, a cabin or passenger compartment having the necessary seating and controls and a landing wheel frame.

Further objects of the invention include, in the construction of a fixed wing aircraft, a plurality of differential control surfaces or ailerons whereby the machine can be tilted to achieve flights varying from the vertical, and the inclusion of a rudder for directional control.

Other and further important objects of the invention will be apparent from the disclosures in the accompanying drawings and following specification.

The invention, in a preferred form, is illustrated in the drawings and hereinafter more fully described.

Figure 1:
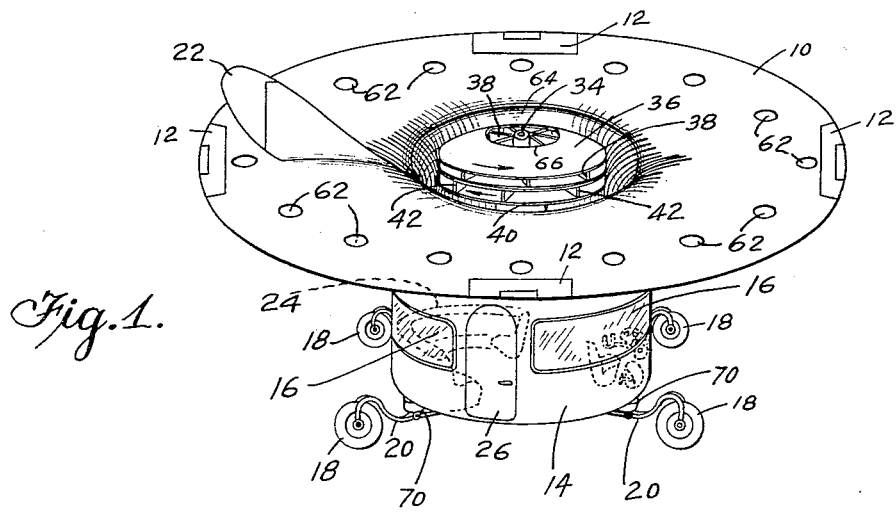
Figure 1 is a perspective view of my improved fixed wing aircraft showing certain details of construction.

The reference numeral 10 indicates generally the circular fixed wing of the improved aircraft of my invention. This is provided with at least four ailerons or variable control surfaces at the edges of the wings as shown at 12, and these are preferably spaced ninety degrees (90°) apart with separate controls leading to the pilot or operator of the device who is seated in the cabin portion 14 having the usual windows or ports 16.

A set of supporting wheels 18 with correlated landing gear 20 is positioned beneath the cabin and these wheels are mounted on casters for free rotation about a vertical axis whereby the craft can be readily moved along the ground in any desired direction.

Figure 2:
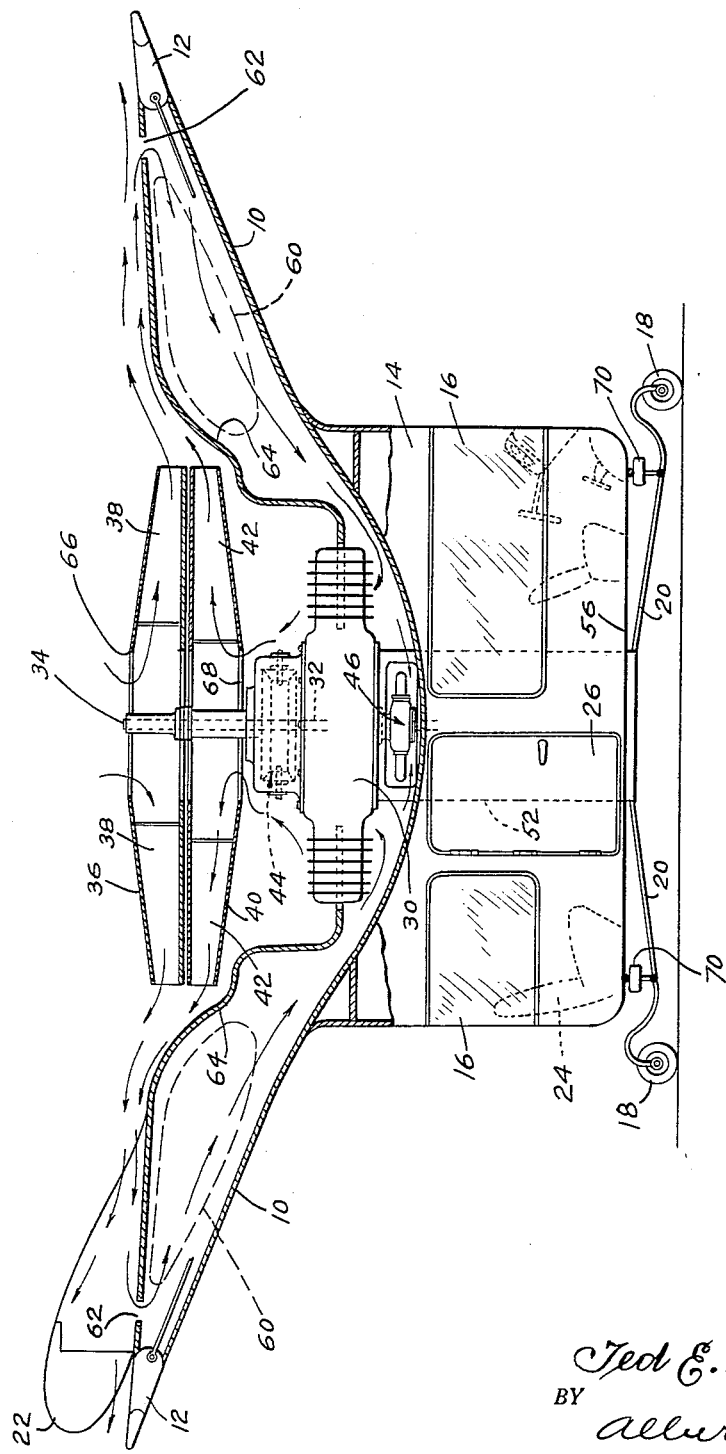
Figure 2 is an enlarged vertical section illustrating more fully the interior construction of the power plant and wings.

A rudder 22 is provided as best shown in Figures 1 and 2 for controlling the direction of motion when the craft is moving more or less horizontally. The ailerons or surfaces control the amount of tilt of the craft after it has attained altitude, and manipulation of the ailerons and rudder produces the desired directional flight.

Seats for passengers in the craft are provided in the circular cabin 14, as best shown at 24, and an entry and exit door is indicated at 26. There may be a plurality of doors.

Figure 3:
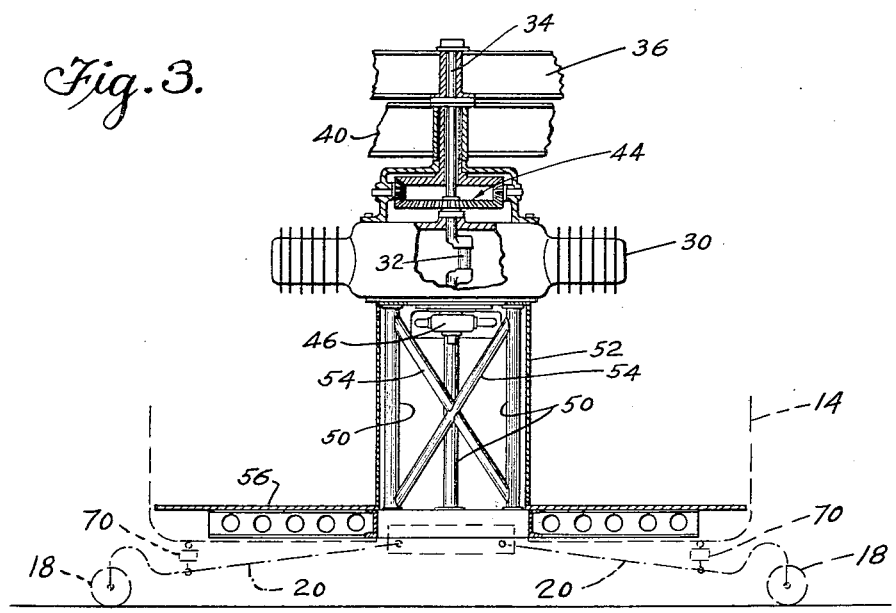
Figure 3 is an enlarged vertical section taken through a portion of the center of the aircraft illustrating more particularly the motive power, the blowers and the cabin or fuselage.

The power plant consists essentially of a conventional multi-cylinder radial engine 30 having a crank shaft 32 and extended drive shaft 34 to which an upper blower 36 is fixed, as best shown in Figure 3. This upper blower includes a rotor having vanes 38 and another rotor 40 having vanes 42 is positioned beneath the rotor or blower 36 and is driven in an opposite direction by a differential gear arrangement 44, also as best shown in Figure 3. The carburetor for the engine is positioned below the same as indicated at 46 in Figure 2.

The engine mounting extends downwardly through the center of the cabin 14 and comprises essentially at least four vertical pipes or standards 50 equally spaced within a circular housing 52 and reinforced by cross braces or pipes 54. The space thus provided can be employed for the storage of baggage, freight or the like.

The cabin floor construction is best shown at 56 in Figure 3 and preferably comprises a radial girder frame with a sub-floor forming space employed for mechanical, hydraulic, electrical and other control mechanisms.

Fuel tanks are disposed within the circular wings 10 as shown at 60 in Figure 2, and it is of course obvious that various types of power may be employed, such as an atomic engine. Also, more or less blowers may be provided.

Air intake slots or openings are provided adjacent the edges of the wing as shown at 62 in Figures 1 and 2, and the exhaust from the engine 30 is preferably at the top of the device to avoid undesirable burning of landing surfaces or adjacent areas, and also to prevent disagreeable blowing up of dust which, while not fatal, is quite a disadvantage so far as the operation of a conventional helicopter is concerned.

The wing structure 10 includes interior air guiding surfaces 64 shaped as best shown in Figure 2 and the blowers or turbines are spaced as close to each other as possible to avoid undesirable turbulence on their respective peripheries.

From an inspection and study of the arrows in Figure 2, it will be noted that air above the craft is drawn in through a central opening 66 in the top of the blower 36 from whence it is forcibly ejected radially and out over the upper surface of the wing 10 producing a vacuum and providing a necessary lift. However, some of the air is drawn in through the openings 62 in the upper wing surface 10 and this flows around the fuel tanks, and being guided by the inner extension 64 of the upper wing surface, will enter the carburetor 46 to provide combustion of the fuel in the engine 30. The air guides 64 are so constructed that a desirable cooling of the engine 30 results from this incoming air, not all of which goes to the carburetor 36. Part of this air flows upwardly and around the engine cylinders producing a cooling action by passing over the fins thereof, and is then drawn into an opening 68 in the lower face of the blower 40 and forcibly ejected to join the stream from the blower 36, which, however, is rotating in a positive direction. This produces both an even flow of air over the lifting surfaces and provides a gyroscopic action for better balancing of the aircraft in one direction, and to eliminate torque.

It will be seen that herein is provided a relatively simple but highly efficient type of aircraft wherein a conventional radial engine or other source of power motivates the gear box and gears which in turn contra-rotates the blowers which pick up air from above producing an initial lifting and then forcing the air out over the wings, whereby a pressure differential between the upper and lower surfaces provides a desired vertical lifting action. The rudder 22 reacts on the forced air so as to produce a turning of the craft about its own vertical axis to gain directional control and the control surfaces or ailerons 12 tilt the aircraft with a new resultant of forces for directional and spot control.

The opening 62 and the baffles 64 bring in sufficient air and properly direct the same for fuel composition for engine cooling, and provide a sufficient supply of air for efficient operation of the blower 40. The engine exhaust can be led upwardly and about the baffles 64 and the exhaust pipes can terminate at selected points on the upper air foil surface 10 to provide additional lift.

The landing gear 18—20 is so constructed as to adequately support the craft while on the ground, and shock absorbers 70 may be included to reduce landing impact and to assist in preventing damage to the craft if a forced landing becomes necessary due to engine failure. The slots or perforations 62 in the upper surface of the wing 10 in addition to providing air intake to the lower blower and the carburetor, also reduces air burble and assists in counteracting torque.

This type of fixed wing air vehicle includes many advantages such as safety due to its ability to land and take off in relatively small spaces and close to people or property without the hazard of whirling rudders or propellers. The circular air foil comprises a virtual parachute in the event of engine failure and additional parachute equipment can be carried for use in such emergencies.

The utility of the device consists essentially in its ability to operate from unprepared areas, the elimination of large landing fields with resultant saving of time and expense, and in addition to its relatively small initial cost, further economies will be effected in that there will be no airport storage expense and no shuffling between home, office and airport, rendering frequent trips over increasingly greater distances quite feasible.

The fact that the cabin construction renders visibility through a complete arc of 360° also provides for safer operation and the symmetrical and integral construction arrangement makes for extreme strength per unit of weight. The symmetrical and integral design readily lends itself to mass production techniques and the convenient height permits of easy entrance and exit.

The passenger and load carrying capacity can obviously be greatly varied, depending upon the motive power. The controls can be hydraulic, electrical or mechanical, whichever is most feasible.

I am aware that many changes may be made and numerous details of construction varied throughout a wide range without departing from the principles of this invention, and I therefore do not propose limiting the patent granted hereon otherwise than as necessitated by the prior art.

I claim as my invention:

An aircraft having a circular fixed wing and ailerons and rudder for the same, the ailerons and rudder being at the periphery of the wing, the ailerons being equally spaced about said periphery, a source of power at the center of said wing, a pair of contra-rotated blowers operated by said power source and arranged to force air out over the upper wing surface, slots in the upper surface of the wing for allowing a flow of air inwardly through said wing to said power source and to one of said blowers, a portion of said flow of air being employed for fuel combustion in the power source, a support depending from said power source, a cabin space surrounding said support, and landing wheels for supporting the cabin and entire structure from below, the exhaust from the engine being radially outwardly over the upper wing surface, and wherein substantially all of the air for blower and engine operation is drawn in from the top of the craft.

References Cited in the file of this patent
UNITED STATES PATENTS

| | | |
|---|---|---|
| 1,846,125 | La Fon | Feb. 23, 1932 |
| 2,547,266 | Hoglin | Apr. 3, 1951 |